US010208637B2

(12) United States Patent
Mulock

(10) Patent No.: US 10,208,637 B2
(45) Date of Patent: Feb. 19, 2019

(54) SUMP TANK FOR A GAS TURBINE ENGINE

(71) Applicant: SOLAR TURBINES INCORPORATED, San Diego, CA (US)

(72) Inventor: Mark Justin Mulock, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 331 days.

(21) Appl. No.: 15/276,538

(22) Filed: Sep. 26, 2016

(65) Prior Publication Data

US 2018/0087403 A1    Mar. 29, 2018

(51) Int. Cl.
| F01M 11/06 | (2006.01) |
| F16N 31/00 | (2006.01) |
| F01D 25/18 | (2006.01) |

(52) U.S. Cl.
CPC ........... F01M 11/064 (2013.01); F01D 25/18 (2013.01); F01M 11/065 (2013.01); F16N 31/004 (2013.01)

(58) Field of Classification Search
CPC .... F16N 31/002; F16N 31/004; F16N 31/006; F01M 11/064; F01M 11/065
See application file for complete search history.

(56) References Cited

U.S. PATENT DOCUMENTS

| 1,365,438 A * | 1/1921 | Adamson ........... F01M 11/0004 165/179 |
| 3,771,287 A | 11/1973 | Sunderland |
| 4,023,548 A * | 5/1977 | Prasch ................. F01M 11/065 123/196 CP |
| 4,346,786 A * | 8/1982 | Midgley ................. F16N 29/02 184/6.2 |
| 4,449,493 A | 5/1984 | Kopec et al. |
| 6,568,509 B1 | 5/2003 | Sugiura |
| 6,845,743 B1 * | 1/2005 | Bishop ............... F01M 11/0004 123/195 C |
| 7,341,039 B1 | 3/2008 | Jaszewski et al. |
| 9,677,436 B2 * | 6/2017 | Mordukhovich .. F01M 11/0004 |
| 2004/0177827 A1 | 9/2004 | Hoyte et al. |
| 2004/0231924 A1 * | 11/2004 | Schwarzl ........... F01M 11/0004 184/6.23 |
| 2005/0252480 A1 * | 11/2005 | Stadtaus ............ F01M 11/0004 123/196 R |
| 2008/0210491 A1 * | 9/2008 | Mori .................. F01M 11/0004 184/106 |
| 2009/0020366 A1 * | 1/2009 | Mori ..................... F01M 5/001 184/106 |

FOREIGN PATENT DOCUMENTS

JP        2964754 B2    10/1999

* cited by examiner

*Primary Examiner* — Minh Truong
(74) *Attorney, Agent, or Firm* — Procopio, Cory, Hargreaves & Savitch LLP

(57) ABSTRACT

A sump tank for use with a gas turbine engine in offshore conditions is disclosed. In embodiments, the sump tank includes two circuitous lubricant flow paths. Each flow path includes an end compartment, a side compartment, and a tube that feed to a central compartment. The baffles used to form the central compartment are angled so as to cause the lubricant entering from the tubes to swirl, which may increase the residence time of the lubricant and may help ensure that any entrained air is released from the lubricant prior to entering the suction line.

20 Claims, 4 Drawing Sheets

SUMP TANK FOR A GAS TURBINE ENGINE

TECHNICAL FIELD

The present disclosure generally pertains to a sump tank for a gas turbine engine, and is directed toward a sump tank capable of handling offshore motion.

BACKGROUND

Various sub systems of gas turbine engines and the equipment driven by the gas turbine engine require lubrication. The sump tank acts as a reservoir for the lubricant. A sump tank used on an offshore vessel is subjected to static and dynamic offshore conditions. Depending on how the vessel is loaded, the vessel may be tilted resulting in a static tilt condition of the sump tank. When the vessel is operating in open water the swells may result in a dynamic tilt that causes the sump tank to sway. Swaying the sump tank may cause the lubricant to slosh within the tank. Static and dynamic tilt conditions can cause lubricant levels to vary within the sump tank. Uneven lubricant levels may apply back pressure to lubricant return lines and may expose lubricant suction lines to air pockets.

The present disclosure is directed toward overcoming one or more of the problems discovered by the inventor or that is known in the art.

SUMMARY OF THE DISCLOSURE

A sump tank for a gas turbine engine is disclosed. In embodiments, the sump tank includes a tank body, a first end baffle, a second end baffle, a first central baffle, a second central baffle, a third central baffle, a fourth central baffle, a first tube, a second tube, a first end lubricant passage, a second end lubricant passage, return lines, and a suction line. The tank body includes a tank base, a tank top above the tank base, a first endwall extending from the tank base to the tank top, a second endwall extending from the tank base to the tank top opposite the first endwall, a first sidewall extending from the tank base to the tank top, and a second sidewall extending from the tank base to the tank top opposite the first sidewall.

The first end baffle extends horizontally from the first sidewall to the second sidewall and vertically from the tank base to the tank top. The first end baffle is located closer to the first endwall than the second endwall and forms a first end compartment with the first endwall, the first sidewall and the second sidewall. The second end baffle extends horizontally from the first sidewall to the second sidewall and vertically from the tank base to the tank top. The second end baffle is located closer to the second endwall than to the first end baffle and forms a second end compartment with the second endwall, the first sidewall and the second sidewall.

The first central baffle extends horizontally from the first end baffle towards the first sidewall at a central baffle angle. The first central baffle is joined to the first end baffle adjacent a midpoint of the first end baffle closer to the first sidewall than to the second sidewall. The second central baffle extends horizontally from the second end baffle towards the first sidewall at the central baffle angle. The second central baffle is joined to the second end baffle adjacent a midpoint of the second end baffle closer to the first sidewall than to the second sidewall. The third central baffle extends horizontally from the second end baffle towards the second sidewall at the central baffle angle. The third central baffle is joined to the second end baffle adjacent the midpoint of the second end baffle closer to the second sidewall than to the first sidewall. The fourth central baffle extends horizontally from the first end baffle towards the second sidewall at the central baffle angle. The fourth central baffle is joined to the first end baffle adjacent the midpoint of the first end baffle closer to the second sidewall than to the first sidewall. The fourth central baffle forms a second side compartment with the third central baffle, the first end baffle, the second end baffle and the second sidewall. The second side compartment is located between the first end compartment and the second end compartment. The fourth central baffle also forms a central compartment with the first central baffle, the second central baffle, the third central baffle, the first end baffle and the second end baffle. The central compartment is located between the first end baffle and the second end baffle as well as between the first side compartment and the second side compartment.

The first tube includes a first tube inlet located in the first side compartment adjacent to the second end baffle and a first tube outlet located in the central compartment adjacent the first end baffle. The first tube includes a first bend. The second tube includes a second tube inlet located in the second side compartment adjacent to the first end baffle and a second tube outlet located in the central compartment adjacent the second end baffle. The second tube includes a second bend. The first end lubricant passage is in the first end baffle adjacent the tank base. The first end lubricant passage fluidly connects the first end compartment and the first side compartment. The second end lubricant passage is in the second end baffle adjacent the tank base. The second end lubricant passage fluidly connects the second end compartment and the second side compartment.

The return lines return lubricant to a plurality of lubricant return locations in the first end compartment adjacent the first end baffle where the first end compartment adjoins the second side compartment and in the second end compartment adjacent the second end baffle where the second end compartment adjoins the first side compartment. The suction line includes a suction line inlet located in the central compartment adjacent to a centroid of the central compartment.

DETAILED DESCRIPTION

The systems and methods disclosed herein include a sump tank for a gas turbine engine capable of handling offshore motion. In embodiments, the sump tank includes two end compartments, two side compartments, a central compartment, and two tubes. The sump tank includes two lubricant flow paths, each including an end compartment, a side compartment, a tube, and the central compartment that form a circuitous path for the lubricant to follow from the return location(s) to the suction line(s). The baffles used to form the central compartment are angled so as to cause the lubricant entering from the tubes to swirl, which may increase the residence time of the lubricant and may help ensure that any entrained air is released from the lubricant prior to entering the suction line(s).

Figure 1:
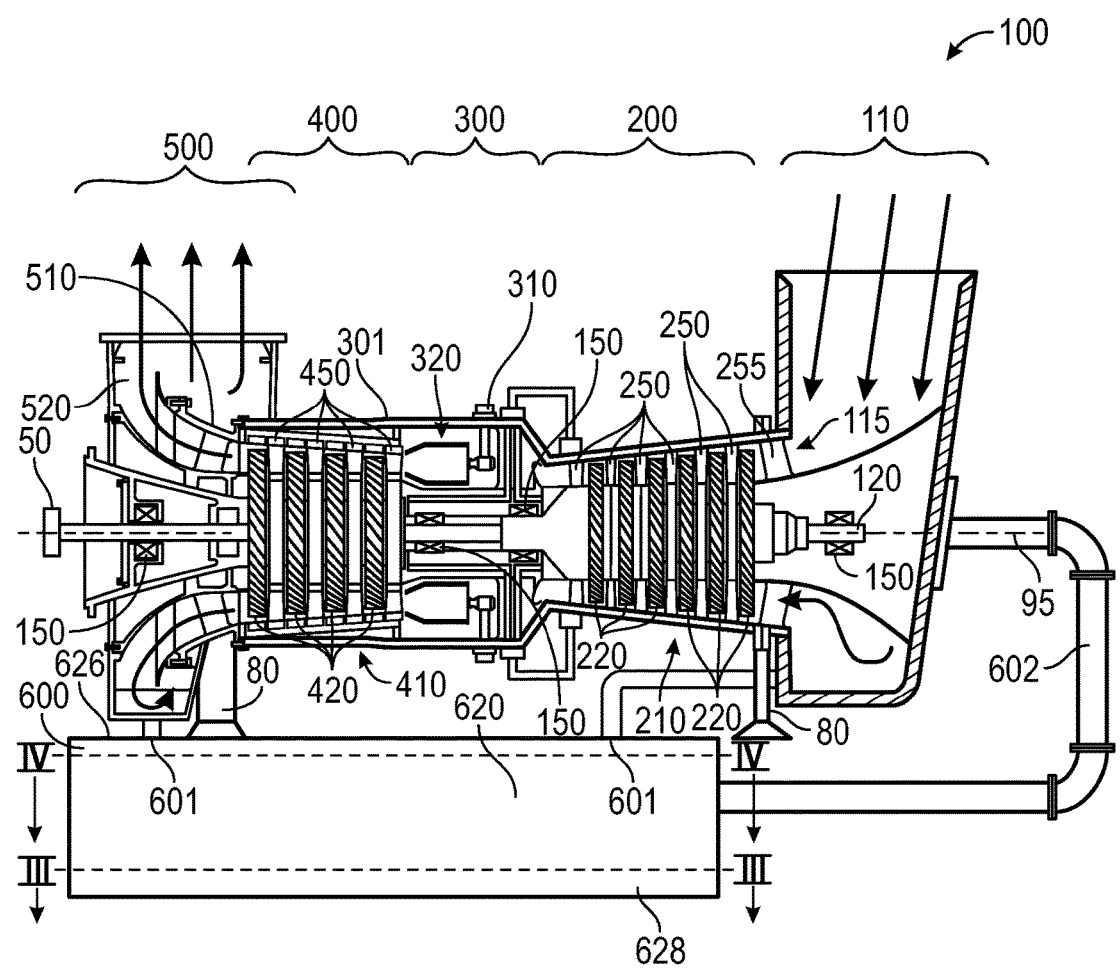
FIG. 1 is a schematic illustration of an exemplary gas turbine engine package including a gas turbine engine 100 and a sump tank 600.

FIG. 1 is a schematic illustration of an exemplary gas turbine engine package including a gas turbine engine 100 and a sump tank 600. Some of the surfaces have been left out or exaggerated (here and in other figures) for clarity and ease of explanation. In addition, the disclosure may generally reference a center axis 95 of rotation of the gas turbine engine 100, which may be generally defined by the longitudinal axis of its shaft 120 (supported by a plurality of bearing assemblies 150). The center axis 95 may be common to or shared with various other engine concentric components.

A gas turbine engine 100 includes an inlet 110, a shaft 120, a compressor 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes (stators) 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes a combustion chamber 320 and one or more fuel injectors 310. The fuel injectors 310 may be upstream of the combustion chamber 320 and may be annularly arranged about center axis 95.

The turbine 400 includes a turbine rotor assembly 410 and turbine nozzles 450. The turbine rotor assembly 410 mechanically couples to the shaft 120. In the embodiment illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 510 and an exhaust collector 520. The power output coupling 50 may be located at an end of shaft 120.

The gas turbine engine 100 may also include supports 80. The supports 80 may be positioned on and supported by the sump tank 600.

The sump tank 600 may be positioned below the gas turbine engine 100. Suction lines 602 may draw lubricant from the sump tank 600 for use by sub systems of the gas turbine engine 100, such as the bearing assemblies 150, and sub systems of the driven equipment. Return lines 601 deposit the used lubricant back into the sump tank 600.

Figure 2:
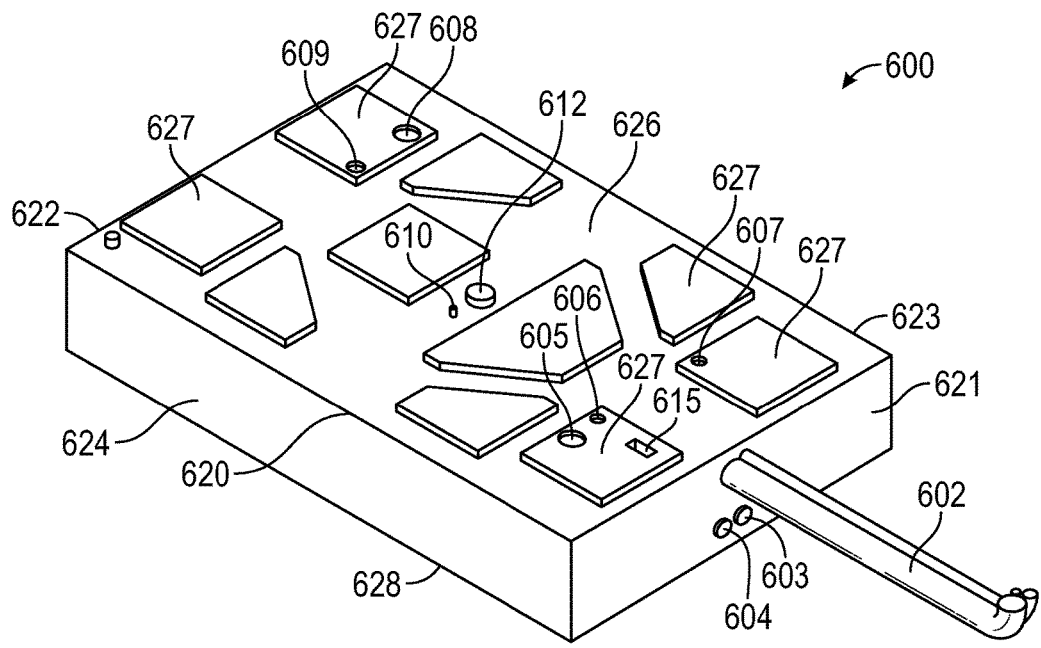
FIG. 2 is a perspective view of an embodiment of the sump tank of FIG. 1.

FIG. 2 is a perspective view of an embodiment of the sump tank 600 of FIG. 1. Referring to FIGS. 1 and 2, the sump tank 600 includes a tank body 620 for containing a lubricant. The tank body 620 may have a hollow rectangular prism shape. The tank body 620 may be formed by a first endwall 621, a second endwall 622, a tank base 628, a tank top 626, a first sidewall 623, and a second sidewall 624. The various components of the tank body 620 may be joined, such as by metallurgical bonding, at adjoining edges. The tank base 628 may form the bottom of the sump tank 600. The tank top 626 may be located above the tank base 628 and may be parallel to the tank base 628.

The first endwall 621 and the second endwall 622 may each be at opposing ends of, may each extend between, and may adjoin the tank top 626 and the tank base 628. Further, the first endwall 621 and the second endwall 622 may each be at opposing ends of, may each extend between and may adjoin the first sidewall 623 and the second sidewall 624. Similarly, the first sidewall 623 and the second sidewall 624 may be located at opposing sides of, may each extend between and may adjoin the tank top 626 and the tank base 628. Further, the first sidewall 623 and the second sidewall 624 may be located at opposing sides, may each extend between and may adjoin the first endwall 621 and the second endwall 622.

The tank top 626 may also include tank lids 627. The tank lids 627 may provide access to the inside of the tank body 620 through openings 625 (shown in FIGS. 7 and 8) in the tank top 626. The tank lids 627 may be positioned over the openings 625. The tank lids 626 may be joined, such as by metallurgical bonding, to other portions of the tank top 626.

The sump tank 600 may also include a number of return locations where the return lines 601 connect to the sump tank 600 to return the lubricant. The return locations may include a first lubricant return 605, a second lubricant return 606, a third lubricant return 607, and a fourth lubricant return 608. The return locations can include, inter alia, the bearing returns and the driven return. Each return location may be at a tank lid 627, which may raise the connection between the tank top 626 and the return lines 601. The return locations may also be located at opposing corners of the sump tank 600.

The sump tank 600 also includes a tank vent 612 and a level transmitter 610. The tank vent 612 is centrally located in the tank body 620, such as at or near the center of the tank body 620. The tank vent 612 may be located at and extend through the tank top 626 to allow air to exit sump tank 600. The level transmitter 610 is centrally located adjacent to the tank vent 612 and may extend through the tank top 626. The level transmitter 610 extends down to a depth of the lowest lubricant level that triggers the low shutdown level and may extend to the tank base 628.

The sump tank 600 may also include a heater 615. A portion of the heater 615 may be located in one of the tank lids 627.

Figure 3:
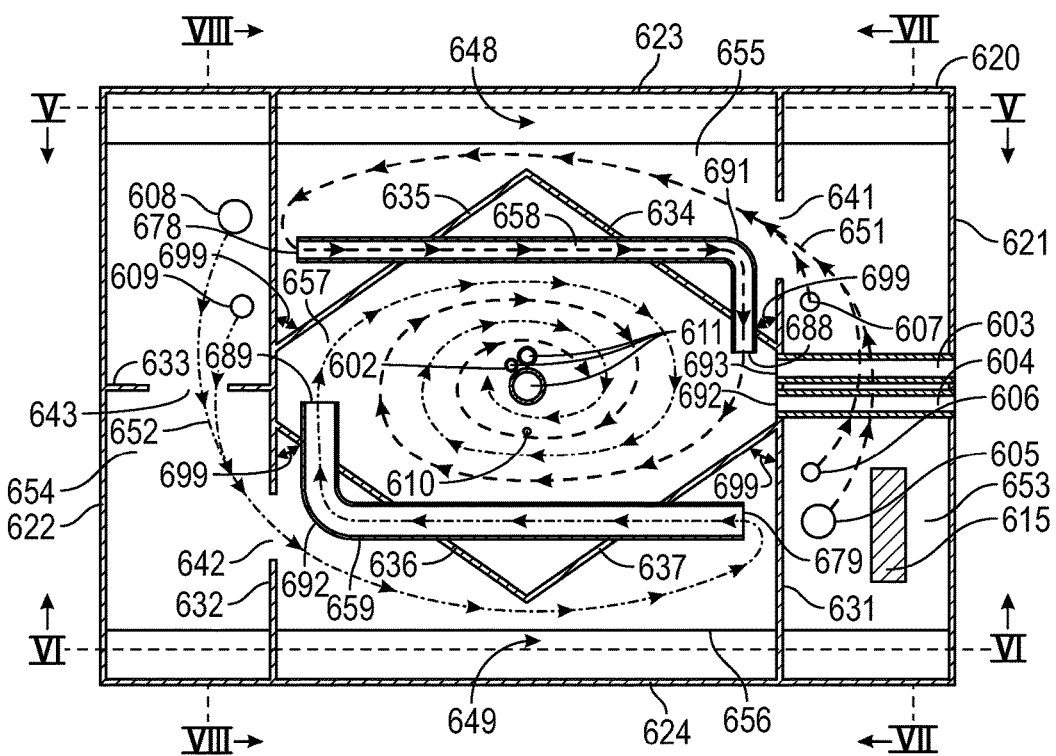
FIG. 3 is a cross-sectional view of the lower portion of the sump tank of FIGS. 1 and 2 cut through the line III-III shown in FIG. 1.
Figure 4:
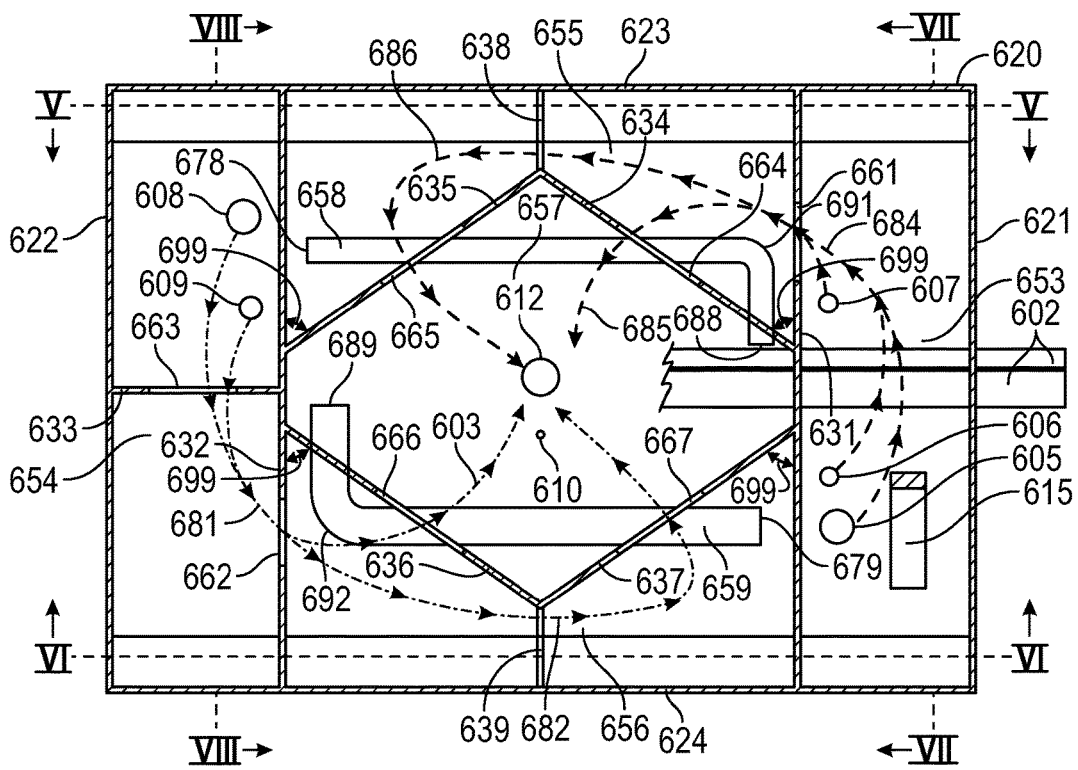
FIG. 4 is a cross-sectional view of the sump tank of FIGS. 1 and 2 cut through the line IV-IV shown in FIG. 1.

FIG. 3 is a cross-sectional view of the lower portion of the sump tank 600 of FIGS. 1 and 2 cut through the line III-III shown in FIG. 1. FIG. 4 is a cross-sectional view of the sump tank 600 of FIGS. 1 and 2 cut through the line IV-IV shown in FIG. 1. The lubricant return locations including the first lubricant return 605, the second lubricant return 606, the third lubricant return 607, and the fourth lubricant return 608 are shown for ease of explanation and clarity. The location of the return lines 601 and their connections to the sump tank top 626, such as to the tank lids 627, are located above the section cuts. Referring to FIG. 3, the dashed lines with arrows are used to illustrate the general circuitous paths the lubricant travels within the sump tank 600 from the lubricant return locations to the suction lines 602. Referring to FIG. 4, the dashed lines with arrows are used to illustrate the general paths the air travels as it separates from the lubricant and travels within the sump tank 600 towards the tank vent 612. Further, a portion of the suction lines 602 are not shown and the location of the tank vent 612 is shown for ease of explanation and clarity. The location of the tank vent 612 and its connection to the sump tank top 626, such as to a tank lid 627, is located above the section cut.

Referring to FIGS. 2 and 3, the sump tank 600 includes a number of baffles that subdivide the interior of the tank body 620 into compartments. The compartment boundaries may be formed by the baffles, portions of the baffles, or a combination thereof. The baffles may be metallurgically bonded to the tank body 620 and to other baffles. Each of the baffles may extend vertically from the tank base 628 toward the tank top 626 and may extend to the tank top 626. The sump tank 600 may include a first end baffle 631, a second end baffle 632, an end division baffle 633, a first central baffle 634, a second central baffle 635, a third central baffle 636, a fourth central baffle 637, a first side division baffle 638, and a second side division baffle 639.

The first end baffle 631 may extend horizontally from the first sidewall 623 to the second sidewall 624 and may be parallel to the first endwall 621. The first end baffle 631 may be closer to the first endwall 621 than the second endwall 622. In the embodiment illustrated, the first end baffle 631 is closer to the first endwall 621 than to the centroid of the tank body 620.

The sump tank 600 may include a first end compartment 653. The first end compartment 653 boundary may include and may be formed by the first end baffle 631, the first endwall 621, the first sidewall 623, and the second sidewall 624. The first end compartment 653 may include a rectangular prism shape. In the embodiment illustrated, the heater 615 used to control the temperature of the lubricant is located in the first compartment 653.

The second end baffle 632 may extend horizontally from the first sidewall 623 to the second sidewall 624 and may be parallel to the second endwall 622. The second end baffle 632 may be closer to the second endwall 622 than the first endwall 621 or than the first end baffle 631. In the embodiment illustrated, the second end baffle 632 is closer to the second endwall 622 than to the centroid of the tank body 620.

The sump tank 600 may include a second end compartment 654. The second end compartment 654 boundary may include and may be formed by the second end baffle 632, the second endwall 622, the first sidewall 623, and the second sidewall 624. The end division baffle 633 may subdivide the second end compartment 654. The end division baffle 633 may extend from the second endwall 622 to the second end baffle 632. In the embodiment illustrated, the end division baffle 633 bisects the second end compartment 654 into two equal parts. The second end compartment 654 may include a rectangular prism shape.

The first central baffle 634 extends from the first end baffle 631 towards the first sidewall 623 at a central baffle angle 699. The first central baffle 634 may be joined to the first end baffle 631 adjacent to the midpoint of the length of the first end baffle 631 between the first sidewall 623 and the second sidewall 624. The first central baffle 634 may be joined to the first end baffle 631 closer to the first sidewall 623 than to the second sidewall 624. In the embodiment illustrated, the first central baffle 634 is joined to the first end baffle 631 closer to the midpoint of the length of the first end baffle 631 than to the point of trisection of the length of the first end baffle 631, where the point of trisection is located between the midpoint of the first end baffle 631 and the first sidewall 623.

The second central baffle 635 extends from the second end baffle 632 towards the first sidewall 623 at the central baffle angle 699. The second central baffle 635 may be joined to the second end baffle 632 adjacent to the midpoint of the length of the second end baffle 632 between the first sidewall 623 and the second sidewall 624. The second central baffle 635 may be joined to the second end baffle 632 closer to the first sidewall 623 than to the second sidewall 624. In the embodiment illustrated, the second central baffle 635 is joined to the second end baffle 632 closer to the midpoint of the length of the second end baffle 632 than to the point of trisection of the length of the second end baffle 632, where the point of trisection is located between the midpoint of the second end baffle 632 and the first sidewall 623. The second central baffle 635 may be symmetrical to the first central baffle 634. In the embodiment illustrated, the second central baffle 635 extends to the first central baffle 634. The first central baffle 634 and the second central baffle 635 may intersect and may be integral, such as a single bent sheet of material or two separate sheets of material joined together.

The sump tank 600 may include a first side compartment 655, the boundary of which may include and may be formed by the first sidewall 623, the first end baffle 631, the first central baffle 634, the second central baffle 635, and the second end baffle 632.

The third central baffle 636 extends from the second end baffle 632 towards the second sidewall 624 at the central baffle angle 699. The third central baffle 636 may be joined to the second end baffle 632 adjacent to the midpoint of the length of the second end baffle 632 between the first sidewall 623 and the second sidewall 624. The third central baffle 636 may be joined to the second end baffle 632 closer to the second sidewall 624 than to the first sidewall 623. In the embodiment illustrated, the third central baffle 636 is joined to the second end baffle 632 closer to the midpoint of the length of the second end baffle 632 than to the point of trisection of the length of the second end baffle 632, where the point of trisection is located between the midpoint of the second end baffle 632 and the second sidewall 624. The third central baffle 636 may be symmetrical to the second central baffle 635.

The fourth central baffle 637 extends from the first end baffle 631 towards the second sidewall 624 at the central baffle angle 699. The fourth central baffle 637 may be joined to the first end baffle 631 adjacent to the midpoint of the length of the first end baffle 631 between the first sidewall 623 and the second sidewall 624. The fourth central baffle 637 may be joined to the first end baffle 631 closer to the second sidewall 624 than to the first sidewall 623. In the embodiment illustrated, the fourth central baffle 637 is joined to the first end baffle 631 closer to the midpoint of the length of the first end baffle 631 than to the point of trisection of the length of the first end baffle 631, where the point of trisection is located between the midpoint of the first end baffle 631 and the second sidewall 624. The fourth central baffle 637 may be symmetrical to the first central baffle 634 and to the third central baffle 636. In the embodiment illustrated, the fourth central baffle 637 extends to the third central baffle 636. The third central baffle 636 and the fourth central baffle 637 may intersect and may be integral, such as a single bent sheet of material or two separate sheets of material joined together. The spacing between the connections of the first central baffle 634 and the fourth central baffle 637 to the first end baffle 631 may be such that the pressure control return 603 and the pressure safety return 604 may be located there between.

The sump tank 600 may include a second side compartment 656, the boundary of which may include and may be formed by the second sidewall 624, the first end baffle 631, the fourth central baffle 637, the third central baffle 636, and the second end baffle 632.

The sump tank 600 may also include a central compartment 657, the boundary of which may include and may be formed by the first central baffle 634, the second central baffle 635, the third central baffle 636, and the fourth central baffle 637. In the embodiment illustrated, the boundary also includes the first end baffle 631 and the second end baffle 632. The central compartment 657 may include a diamond shape.

Figure 5:
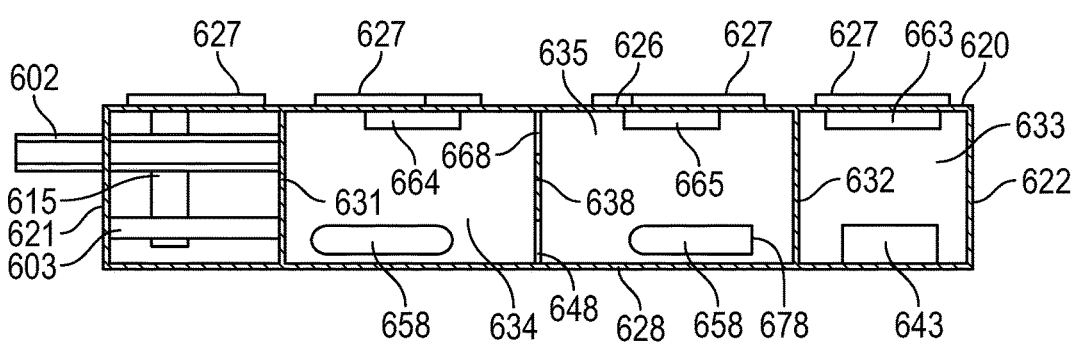
FIG. 5 is a cross-sectional view of a first side of the sump tank cut through the line V-V shown in FIGS. 3 and 4.

FIG. 5 is a cross-sectional view of a first side of the sump tank cut through the line V-V shown in FIGS. 3 and 4. Referring to FIGS. 4 and 5, the first side division baffle 638 may bisect the first side compartment 655 and may extend from the first sidewall 623 toward the second sidewall 624. In the embodiment illustrated, the first side division baffle 638 extends to the intersection of the first central baffle 634 and the second central baffle 635. As illustrated in FIG. 5, the first side division baffle 638 may be centered vertically, may not extend to, and may be offset from the tank top 626 forming a first side divider air passage 668 therebetween and the tank base 628 forming a first side divider lubricant passage 648 therebetween.

Figure 6:
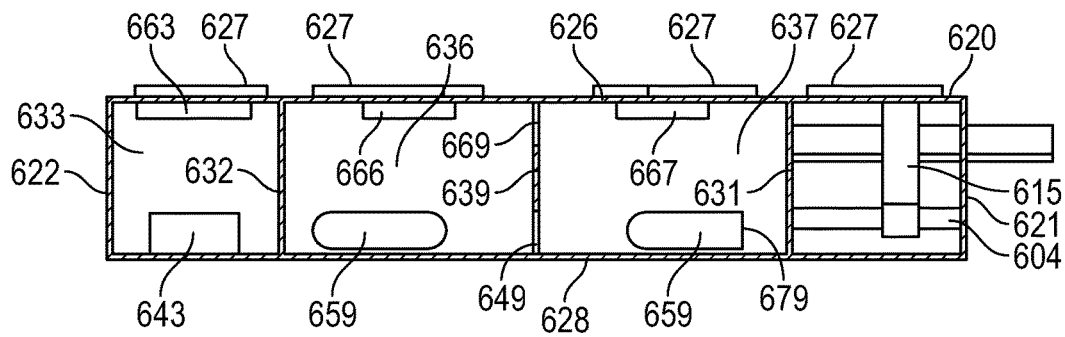
FIG. 6 is a cross-sectional view of a second side of the sump tank cut through the line VI-VI shown in FIGS. 3 and 4.

FIG. 6 is a cross-sectional view of a second side of the sump tank cut through the line VI-VI shown in FIGS. 3 and 4. Referring to FIGS. 3 and 6, the second side division baffle 639 may bisect the second side compartment 656 and may extend from the second sidewall 624 toward the first sidewall 623. In the embodiment illustrated, the second side division baffle 639 extends to the intersection of the third central baffle 636 and the fourth central baffle 637. As illustrated in FIG. 6, the second side division baffle 639 may be centered vertically, may not extend to, and may be offset from the tank top 626 forming a second side divider air passage 669 therebetween and the tank base 628 forming a second side divider lubricant passage 649 therebetween.

Referring to FIGS. 4, 5, and 6, the end division baffle 633 may include an end divider air passage 663. The end divider air passage 663 may be adjacent the tank top 626 and may be a slot or a cut-out in the end division baffle 633. Referring to FIGS. 3, 5, and 6, the end division baffle 633 may also include an end divider lubricant passage 643. The end divider lubricant passage 643 may be adjacent the tank base 628 and may be a slot or cut-out in the end division baffle 633.

Referring to FIGS. 4 and 5, the first central baffle 634 may include a first central air passage 664. The first central air passage 664 may be adjacent the tank top 626 and may be a slot or a cut-out in the first central baffle 634. The second central baffle 635 may include a second central air passage 665. The second central air passage 665 may be adjacent the tank top 626 and may be a slot or a cut-out in the second central baffle 635. The first central air passage 664 and second central air passage 665 may be located between, may fluidly connect, and may be positioned to allow airflow between the first side compartment 655 and the central compartment 657.

Referring to FIGS. 4 and 6, the third central baffle 636 may include a third central air passage 666. The third central air passage 666 may be adjacent the tank top 626 and may be a slot or a cut-out in the third central baffle 636. The fourth central baffle 637 may include a fourth central air passage 667. The fourth central air passage 667 may be adjacent the tank top 626 and may be a slot or a cut-out in the fourth central baffle 637. The third central air passage 666 and the fourth central air passage 667 may be located between, may fluidly connect, and may be positioned to allow airflow between the second side compartment 656 and the central compartment 657.

Figure 7:
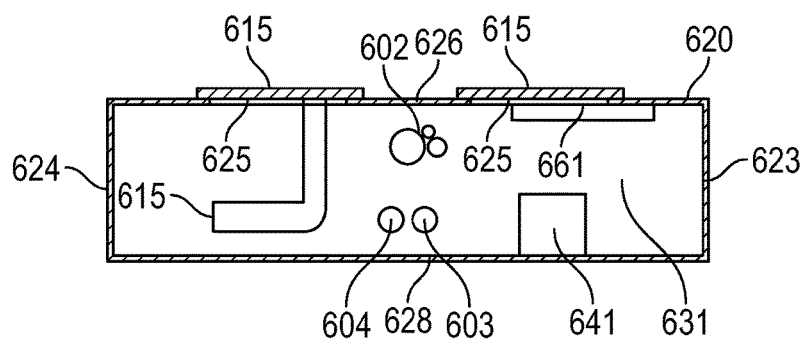
FIG. 7 is a cross-sectional view of a first end of the sump tank cut through the line VII-VII shown in FIGS. 3 and 4.

FIG. 7 is a cross-sectional view of a first end of the sump tank cut through the line VII-VII shown in FIGS. 3 and 4. Referring to FIGS. 4 and 7, the first end baffle 631 may include a first end air passage 661. The first end air passage 661 may be adjacent the tank top 626 and may be a slot or a cut-out in the first end baffle 631. The first end air passage 661 may be located closer to the first sidewall 623 than the second sidewall 624 and may be located between, may fluidly connect, and may be positioned to allow airflow between the first end compartment 653 and the first side compartment 655. Referring to FIGS. 3 and 7, the first end baffle 631 may also include a first end lubricant passage 641. The first end lubricant passage 641 may be adjacent the tank base 628 and may be a slot or cut-out in the first end baffle 631. The first end lubricant passage 641 may be located below the first end air passage 661 and may be located between, may fluidly connect, and may be positioned to allow the lubricant to flow between the first end compartment 653 and the first side compartment 655.

Figure 8:
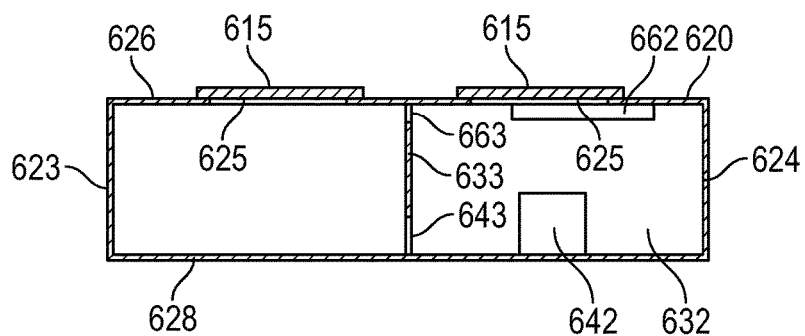
FIG. 8 is a cross-sectional view of a second end of the sump tank cut through the line VIII-VIII shown in FIGS. 3 and 4.

FIG. 8 is a cross-sectional view of a second end of the sump tank cut through the line VIII-VIII shown in FIGS. 3 and 4. Referring to FIGS. 4 and 8, the second end baffle 632 may include a second end air passage 662. The second end air passage 662 may be adjacent the tank top 626 and may be a slot or a cut-out in the second end baffle 632. The second end air passage 662 may be located closer to the second sidewall 624 than the first sidewall 623 and may be located between, may fluidly connect, and may be positioned to allow airflow between the second end compartment 654 and the second side compartment 656. Referring to FIGS. 3 and 8, the second end baffle 632 may also include a second end lubricant passage 642. The second end lubricant passage 642 may be adjacent the tank base 628 and may be a slot or cut-out in the second end baffle 632. The second end lubricant passage 642 may be located below the second end air passage 662 and may be located between, may fluidly connect, and may be positioned to allow the lubricant to flow between the second end compartment 654 and the second side compartment 656.

Referring to FIGS. 3 and 4, the sump tank 600 may also include a first tube 658 and a second tube 659. The first tube 658 and the second tube 659 may be circular, square, or rectangular tubes. The first tube 658 may include a first bend 691 and may be located adjacent the tank base 628 (as shown in FIGS. 5 and 6). The second tube 659 may include a second bend 692 and may also be located adjacent the tank base 628 (as shown in FIGS. 5 and 6). The first bend 691 and the second bend 692 may include, inter alia, a 90 degree elbow or two 45 degree elbows. In embodiments including multiple elbows, such as two 45 degree elbows, the elbows may be adjoining or may be separated by a portion of the tube.

The first tube 658 may include a first tube inlet 678 and a first tube outlet 688. The first tube inlet 678 may be located in the first side compartment 655 adjacent the second end baffle 632, distal to the first end lubricant passage 641. The first tube outlet 688 may be located in the central compartment 657 and adjacent the first end baffle 631 and the first central baffle 634. The first tube outlet 688 may be oriented to direct lubricant out of the first tube 658 towards the fourth central baffle 637 and may be oriented parallel to the first end baffle 631. In the embodiment illustrated, the first tube 658 extends through the first central baffle 634 and the second central baffle 635.

The second tube 659 may include a second tube inlet 679 and a second tube outlet 689. The second tube inlet 679 may be located in the second side compartment 656 adjacent the first end baffle 631, distal to the second end lubricant passage 642. The second tube outlet 689 may be located in the central compartment 657 and adjacent the second end baffle 632 and the third central baffle 636. The second tube outlet 689 may be oriented to direct lubricant out of the second tube 659 towards the second central baffle 635 and may be oriented parallel to the second end baffle 632. In the embodiment illustrated, the second tube 659 extends through the third central baffle 636 and the fourth central baffle 637.

The cross-sectional area of the first tube 658 and the second tube 659 may control the velocity of the flow through the tubes. In particular, the cross-sectional area of the first tube outlet 688 and the second tube outlet 689 may control the exit velocity of the lubricant as the lubricant exits the tubes and enters the central compartment 657. If the exit velocity is too slow, the lubricant in the central compartment 657 may not swirl. If the velocity through and out of the tubes is too fast, the lubricant may become turbulent, which may cause pseudo-cavitation and entrain air into the lubricant. The cross-sectional areas of the first tube 658 and the second tube 659 may be different sizes, depending on the depending on the mass flow requirements of the lubricant through each of the tubes.

The central baffle angle 699 may be such that the central baffles redirect the lubricant and cause the lubricant to swirl in the central compartment 657. In embodiments, the central baffle angle 699 is from 45 degrees to 65 degrees. In other embodiments, the central baffle angle 699 is from 50 to 60 degrees. In further embodiments, the central baffle angle 699 is 55 degrees or within a manufacturing tolerance of 55 degrees.

The lubricant return locations are situated in the first end compartment 653 and the second end compartment 654 adjacent the first end baffle 631 and the second end baffle 632. In the embodiment illustrated, the first lubricant return 605, the second lubricant return 606, and the third lubricant return 607 are located in the first end compartment 653 adjacent the first end baffle 631; and the fourth lubricant return 608 and the fifth lubricant return 609 are located in the second end compartment 654 adjacent to the second end baffle.

The suction lines 602 may extend through a portion of the tank body 620. In the embodiment illustrated, the suction lines 602 extend from the central compartment 657, through the first end compartment 653, and through the first endwall 621. Each suction line 602 may include a suction line inlet 611 located in the central compartment 657. The suction line inlets 611 may be located adjacent the centroid of the central compartment 657 and adjacent the centroid of the tank body 620. The tank vent 612 may be located above the suction line inlets 611, above the central compartment 657, and adjacent the centroid of the tank body 620.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries. Many of these industries operate in both onshore and offshore locations.

Gas turbine engines operating offshore may be subjected to both static conditions and dynamic conditions. Static conditions may include static tilt, where the gas turbine engine package is tilted relative to its standard operating conditions, which can occur from an imbalance in the loading of an offshore vessel. Dynamic conditions may include dynamic tilt and sloshing of the lubricant as an offshore vessel travels in open water.

By subdividing the sump tank 600 into a number of compartments, the effects of static and dynamic tilt may be reduced. For example, when the sump tank 600 tilts, the lubricant level may build up against each wall and baffle located in the direction of the tilt, subdividing the amount of lubricant built up into multiple locations, rather than in a single location. The lubricant returns are located in the end compartments, behind and adjacent to the end baffles, which may prevent the lubricant from building up and reaching the lubricant return line connections at the top of the sump tank and prevent the lubricant from causing back pressure in the lubricant return lines 601.

Similarly, locating the tank vent 612 near the centroid of the tank body 620 and above the central compartment 657 may prevent the lubricant level from building up and blocking the tank vent 612.

The pressure in the sump tank 600 may be lowest at the location of the tank vent 612. The lower pressure may slightly raise the lubricant level in the central compartment 657 and in particular around the centroid of the tank body 620. Thus, locating the suction line inlets 611 within the central compartment 657 below the tank vent 612 at or adjacent to the centroid of the tank body 620 or of the central compartment 657 may help ensure that the suction line inlets 611 remain submerged in the lubricant at lower lubricant levels.

The lubricant fed back into the sump tank 600 by the return lines 601 may have entrained air. Referring to FIG. 3, the compartments, lubricant passages, and tubes may form circuitous lubricant flow paths that result in lubricant residence times in the sump tank 600 that allow the entrained air to release from the lubricant and exit the tank vent 612. In the embodiment illustrated, the sump tank 600 includes a first lubricant flow path 651 and a second lubricant flow path 652.

Lubricant returned to the sump tank 600 within the first end compartment 653, such as by the first lubricant return 605, the second lubricant return 606 and the third lubricant return 607, may travel along the first lubricant flow path 651. The first lubricant flow path 651 may travel through the first end compartment 653, pass through the first end lubricant passage 641 into the first side compartment 655, across the first side compartment 655 and into the first tube 658 at the first tube inlet 678, through the first tube 658 and exiting the first tube outlet 688 into the central compartment 657 where the lubricant is directed into the fourth central baffle 637. The central baffle angles 699 of the central baffles may cause the lubricant to swirl within the central compartment 657, which may increase the residence time of the lubricant as the lubricant swirls from the outer portions of the central compartment 657 to the centroid of the tank body 620 and central compartment 657 where the suction line inlets 611 are located.

Lubricant returned to the sump tank 600 within the second end compartment 654, such as by the fourth lubricant return 608 and the fifth lubricant return 609, may travel along the second lubricant flow path 652. The second lubricant flow path 652 may travel through the second end compartment 654 and the end divider lubricant passage 643, pass through the second end lubricant passage 642 into the second side compartment 656, across the second side compartment 656 and into the second tube 659 at the second tube inlet 679, through the second tube 659 and exiting the second tube outlet 689 into the central compartment 657 where the lubricant is directed into the second central baffle 635. The lubricant traversing the second lubricant flow path 652 may mix and swirl with the lubricant traversing the first lubricant flow path 651 as it enters the central compartment 657.

The preceding detailed description is merely exemplary in nature and is not intended to limit the invention or the application and uses of the invention. The described embodiments are not limited to use in conjunction with a particular type of industrial machine. Although the present disclosure, for convenience of explanation, depicts and describes particular embodiments of the sump tank in conjunction with a gas turbine engine, it will be appreciated that the sump tank in accordance with this disclosure can be implemented in various other configurations, and can be used with other types of gas turbine engines and other types of industrial machines. Any explanation in connection with one embodiment applies to similar features of other embodiments, and elements of multiple embodiments can be combined to form other embodiments. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A sump tank for a gas turbine engine, the sump tank comprising:
    a tank body for containing a lubricant, the tank body including
        a tank base,
        a tank top above the tank base,
        a first endwall extending from the tank base to the tank top,
        a second endwall extending from the tank base to the tank top opposite the first endwall,
        a first sidewall extending from the tank base to the tank top, and
        a second sidewall extending from the tank base to the tank top opposite the first sidewall;
    a first end baffle extending from the first sidewall to the second sidewall and from the tank base to the tank top, the first end baffle being located closer to the first endwall than the second endwall and forming a first end compartment with the first endwall, and portions of the first sidewall and the second sidewall;
    a second end baffle extending from the first sidewall to the second sidewall and from the tank base to the tank top, the second end baffle being located closer to the second endwall than the first end baffle and forming a second end compartment with the second endwall, and portions of the first sidewall and the second sidewall;
    a first central baffle extending from the first end baffle towards the first sidewall at a central baffle angle, the first central baffle joined to the first end baffle adjacent a midpoint of the first end baffle and closer to the first sidewall than to the second sidewall;
    a second central baffle extending from the second end baffle towards the first sidewall at the central baffle angle, the second central baffle joined to the second end baffle adjacent a midpoint of the second end baffle and closer to the first sidewall than to the second sidewall, the second central baffle forming a first side compartment with the first central baffle, and portions of the first end baffle, the second end baffle and the first sidewall, the first side compartment located between the first end compartment and the second end compartment;
    a third central baffle extending from the second end baffle towards the second sidewall at the central baffle angle, the third central baffle joined to the second end baffle adjacent the midpoint of the second end baffle and closer to the second sidewall than to the first sidewall;
    a fourth central baffle extending from the first end baffle towards the second sidewall at the central baffle angle, the fourth central baffle joined to the first end baffle adjacent the midpoint of the first end baffle and closer to the second sidewall than to the first sidewall, the fourth central baffle forming a second side compartment with the third central baffle, and portions of the first end baffle, the second end baffle and the second sidewall, the second side compartment located between the first end compartment and the second end compartment, and the fourth central baffle forming a central compartment with the first central baffle, the second central baffle, the third central baffle, the first end baffle and the second end baffle, the central compartment located between the first end baffle and the second end baffle as well as between the first side compartment and the second side compartment;
    a first tube including a first tube inlet located in the first side compartment adjacent to the second end baffle and a first tube outlet located in the central compartment adjacent the first end baffle, the first tube including a first bend;
    a second tube including a second tube inlet located in the second side compartment adjacent to the first end baffle and a second tube outlet located in the central compartment adjacent the second end baffle, the second tube including a second bend;
    a first end lubricant passage in the first end baffle adjacent the tank base, the first end lubricant passage fluidly connecting the first end compartment and the first side compartment;
    a second end lubricant passage in the second end baffle adjacent the tank base, the second end lubricant passage fluidly connecting the second end compartment and the second side compartment;
    return lines connected to the tank top at return locations above the first end compartment adjacent the first end baffle and above the second end compartment adjacent the second end baffle; and
    a suction line including a suction line inlet located in the central compartment adjacent to a centroid of the central compartment.

2. The sump tank of claim 1, further comprising:
    a tank vent located above the suction line inlet;

a first end air passage located in the first end baffle adjacent the tank top and fluidly connecting the first end compartment and the first side compartment;
a second end air passage located in the second end baffle adjacent the tank top and fluidly connecting the second end compartment and the second side compartment;
a first central air passage in the first central baffle adjacent the tank top;
a second central air passage in the second central baffle adjacent the tank top;
a third central air passage in the third central baffle adjacent the tank top; and
a fourth central air passage in the fourth central baffle adjacent the tank top.

3. The sump tank of claim 2, wherein the first central baffle and the second central baffle intersect and are integral, and the third central baffle and the fourth central baffle intersect and are integral.

4. The sump tank of claim 3, further comprising:
a first side division baffle extending from the first sidewall to the intersection of the first and second central baffles subdividing the first side compartment, the first side division baffle is offset from the tank top forming a first side divider air passage therebetween and is offset from the tank base forming a first side divider lubricant passage therebetween;
a second side division baffle extending from the second sidewall to the intersection of the third and fourth central baffles subdividing the second side compartment, the second side division baffle being offset from the tank top forming a second side air passage therebetween and being offset from the tank base forming a second side lubricant passage therebetween;
an end division baffle extending from the second endwall to the second end baffle, the end division baffle subdividing the second end compartment; and
an end divider lubricant passage in the end division baffle adjacent to the tank base.

5. The sump tank of claim 1, wherein a first cross-sectional area of the first tube and a second cross-sectional area of the second tube are sized to maintain the velocity of the lubricant high enough to cause the lubricant in the central compartment to swirl and low enough to prevent turbulent flow of the lubricant.

6. The sump tank of claim 1, further comprising a level transmitter in the central compartment adjacent the suction line inlet.

7. The sump tank of claim 1, wherein the central baffle angle is from 45 to 65 degrees.

8. A sump tank for a gas turbine engine, the sump tank comprising:
a tank body for containing a lubricant, the tank body including
a tank base,
a tank top above the tank base,
a first endwall extending from the tank base to the tank top,
a second endwall extending from the tank base to the tank top opposite the first endwall,
a first sidewall extending from the tank base to the tank top, and
a second sidewall extending from the tank base to the tank top opposite the first sidewall;
a first end compartment including a first rectangular prism shape, the first end compartment boundary including the first endwall, the first sidewall, the second sidewall, and a first end baffle extending from the first sidewall to the second sidewall parallel to the first endwall, the first end baffle being located closer to the first endwall than to the second endwall;
a second end compartment opposite the first end compartment and including a rectangular prism shape, the second end compartment boundary including the second endwall, the first sidewall, the second sidewall, and a second end baffle extending from the first sidewall to the second sidewall parallel to the second endwall, the second end baffle being located closer to the second endwall than to the first end baffle;
a first side compartment located between the first end compartment and the second end compartment, the first side compartment boundary including the first sidewall, the first end baffle, the second end baffle, a first central baffle extending from the first end baffle towards the first sidewall at a central baffle angle, the first central baffle joined to the first end baffle closer to the first sidewall than to the second sidewall, and a second central baffle extending from the second end baffle towards the first sidewall at the central baffle angle, the second central baffle joined to the second end baffle closer to the first sidewall than to the second sidewall;
a second side compartment opposite the first side compartment located between the first end compartment and the second end compartment, the second side compartment boundary including the second sidewall, the first end baffle, the second end baffle, a third central baffle extending from the second end baffle towards the second sidewall at the central baffle angle, the third central baffle joined to the second end baffle closer to the second sidewall than to the first sidewall, and a fourth central baffle extending from the first end baffle towards the second sidewall at the central baffle angle, the fourth central baffle joined to the first end baffle closer to the second sidewall than to the first sidewall;
a central compartment including a diamond shape located between the first end compartment and the second end compartment, and between the first side compartment and the second side compartment, the central compartment boundary including the first central baffle, the second central baffle, the third central baffle, and the fourth central baffle;
a first tube including a first tube inlet located in the first side compartment adjacent to the second end baffle and a first tube outlet located in the central compartment adjacent the first end baffle, the first tube including a first bend;
a second tube including a second tube inlet located in the second side compartment adjacent to the first end baffle and a second tube outlet located in the central compartment adjacent the second end baffle, the second tube including a second bend;
the first end baffle including a first end lubricant passage adjacent the tank base, the first end lubricant passage between the first end compartment and the first side compartment;
the second end baffle including a second end lubricant passage adjacent the tank base, the second end lubricant passage between the second end compartment and the second side compartment;
return lines connected to the tank top at return locations above the first end compartment adjacent the first end baffle and above the second end compartment adjacent the second end baffle; and a suction line including a suction line inlet located in the central compartment adjacent to a centroid of the central compartment.

9. The sump tank of claim 8, further comprising:
a tank vent located above the suction line inlet;
the first end baffle also including a first end air passage adjacent the tank top between the first end compartment and the first side compartment;
the second end baffle also including a second end air passage adjacent the tank top between the second end compartment and the second side compartment;
the first central baffle including a first central air passage adjacent the tank top;
the second central baffle including a second central air passage adjacent the tank top;
the third central baffle including a third central air passage adjacent the tank top; and
the fourth central baffle including a fourth central air passage adjacent the tank top.

10. The sump tank of claim 9, wherein the first central baffle and the second central baffle are integral, and the third central baffle and the fourth central baffle are integral.

11. The sump tank of claim 10, further comprising:
a first side division baffle extending from the first sidewall to the first and second central baffles subdividing the first side compartment, the first side division baffle is offset from the tank top forming a first side divider air passage therebetween and is offset from the tank base forming a first side divider lubricant passage therebetween; and
a second side division baffle extending from the second sidewall to the third and fourth central baffles subdividing the second side compartment, the second side division baffle being offset from the tank top forming a second side air passage therebetween and being offset from the tank base forming a second side lubricant passage therebetween.

12. The sump tank of claim 11, further comprising an end division baffle extending from the second endwall to the second end baffle subdividing the second end compartment, the end division baffle including an end divider lubricant passage adjacent to the tank base and an end divider air passage adjacent to the tank top.

13. The sump tank of claim 8, further comprising a level transmitter in the central compartment adjacent the suction line inlet.

14. The sump tank of claim 8, wherein the central baffle angle is from 45 to 65 degrees.

15. A sump tank for a gas turbine engine, the sump tank comprising:
a tank body for containing a lubricant, the tank body including
a tank base,
a tank top above the tank base,
a first endwall extending from the tank base to the tank top,
a second endwall extending from the tank base to the tank top opposite the first endwall,
a first sidewall extending from the tank base to the tank top, and
a second sidewall extending from the tank base to the tank top opposite the first sidewall;
a first end compartment within the tank body, the first end compartment boundary including the first endwall, the first sidewall, the second sidewall, and a first end baffle extending from the first sidewall to the second sidewall, the first end baffle being located closer to the first endwall than to the second endwall;
a second end compartment within the tank body opposite the first end compartment, the second end compartment boundary including the second endwall, the first sidewall, the second sidewall, and a second end baffle extending from the first sidewall to the second sidewall parallel to the second endwall, the second end baffle being located closer to the second endwall than to the first end baffle;
a first side compartment within the tank body located between and adjoining the first end compartment and the second end compartment, the first side compartment boundary including the first sidewall, the first end baffle, the second end baffle, a first central baffle extending from the first end baffle towards the first sidewall at a central baffle angle from 45 to 65 degrees, the first central baffle joined to the first end baffle closer to the first sidewall than to the second sidewall, and a second central baffle extending from the second end baffle towards the first sidewall at the central baffle angle, the second central baffle joined to the second end baffle closer to the first sidewall than to the second sidewall;
a second side compartment within the tank body opposite the first side compartment located between and adjoining the first end compartment and the second end compartment, the second side compartment boundary including the second sidewall, the first end baffle, the second end baffle, a third central baffle extending from the second end baffle towards the second sidewall at the central baffle angle, the third central baffle joined to the second end baffle closer to the second sidewall than to the first sidewall, and a fourth central baffle extending from the first end baffle towards the second sidewall at the central baffle angle, the fourth central baffle joined to the first end baffle closer to the second sidewall than to the first sidewall;
a central compartment within the tank body located between the first end compartment and the second end compartment, and between the first side compartment and the second side compartment, the central compartment boundary including the first central baffle, the second central baffle, the third central baffle, and the fourth central baffle;
a first tube including a first tube inlet located in the first side compartment adjacent to the second end baffle and a first tube outlet located in the central compartment adjacent the first end baffle, the first tube including a first bend;
a second tube including a second tube inlet located in the second side compartment adjacent to the first end baffle and a second tube outlet located in the central compartment adjacent the second end baffle, the second tube including a second bend;
the first end baffle including a first end lubricant passage adjacent the tank base, the first end lubricant passage between the first end compartment and the first side compartment;
the second end baffle including a second end lubricant passage adjacent the tank base, the second end lubricant passage between the second end compartment and the second side compartment;
return lines connected to the tank top at return locations above the first end compartment adjacent the first end baffle and above the second end compartment adjacent the second end baffle; and a suction line including a suction line inlet located in the central compartment adjacent to a centroid of the central compartment where the first end compartment, the first side compartment and the first tube form a first lubricant flow path to the central compartment, and the second end compartment, the second side compartment and the second tube form a second lubricant flow path to the central compartment.

16. The sump tank of claim 15, further comprising:
a tank vent located above the suction line inlet;
the first end baffle also including a first end air passage adjacent the tank top between the first end compartment and the first side compartment;
the second end baffle also including a second end air passage adjacent the tank top between the second end compartment and the second side compartment;
the first central baffle including a first central air passage adjacent the tank top;
the second central baffle including a second central air passage adjacent the tank top;
the third central baffle including a third central air passage adjacent the tank top; and
the fourth central baffle including a fourth central air passage adjacent the tank top.

17. The sump tank of claim 15, wherein the first central baffle and the second central baffle are integral, and the third central baffle and the fourth central baffle are integral.

18. The sump tank of claim 17, further comprising:
a first side division baffle extending from the first sidewall to the first and second central baffles subdividing the first side compartment, the first side division baffle is offset from the tank base forming a first side divider lubricant passage therebetween; and
a second side division baffle extending from the second sidewall to the third and fourth central baffles subdividing the second side compartment, the second side division baffle being offset from the tank base forming a second side lubricant passage therebetween.

19. The sump tank of claim 15, further comprising an end division baffle extending from the second endwall to the second end baffle subdividing the second end compartment, the end division baffle including an end divider lubricant passage adjacent to the tank base.

20. The sump tank of claim 15, further comprising a level transmitter in the central compartment adjacent the suction line inlet.

* * * * *